United States Patent
Hu et al.

(10) Patent No.: US 9,693,314 B2
(45) Date of Patent: Jun. 27, 2017

(54) POWER CONSUMPTION DETECTION SYSTEM AND METHOD FOR ELECTRONIC DEVICE

(71) Applicant: Chiun Mai Communication Systems, Inc., New Taipei (TW)

(72) Inventors: Chia-Jung Hu, New Taipei (TW); Li-Bin Shen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/981,057

(22) Filed: Dec. 28, 2015

(65) Prior Publication Data

US 2016/0353384 A1 Dec. 1, 2016

(30) Foreign Application Priority Data

May 27, 2015 (CN) .......................... 2015 1 0276098

(51) Int. Cl.
*H04M 1/00* (2006.01)
*H04W 52/02* (2009.01)
*H04M 1/725* (2006.01)

(52) U.S. Cl.
CPC ... *H04W 52/0261* (2013.01); *H04M 1/72519* (2013.01); *H04W 52/0225* (2013.01)

(58) Field of Classification Search
CPC .. G06F 1/3293; G06F 1/3206; G06F 11/3495; G06F 11/3062; H04W 52/0235; H04W 52/44; H04W 52/0261; H04W 4/206; H04W 1/72519; H04W 52/0225; H04L 1/1812; H04L 5/0055; H04L 67/306; H04L 51/32; H04M 1/575

USPC .............................. 455/566; 341/135; 700/91
See application file for complete search history.

(56) References Cited

U.S. PATENT DOCUMENTS

| | | | | |
|---|---|---|---|---|
| 9,350,550 | B2 * | 5/2016 | Nix .................... | H04W 52/0235 |
| 2003/0087682 | A1 * | 5/2003 | Cathey ................. | H02J 7/0063 |
| | | | | 455/574 |
| 2004/0082362 | A1 * | 4/2004 | Peng .................. | H04W 52/0277 |
| | | | | 455/556.2 |
| 2005/0250531 | A1 * | 11/2005 | Takebe .............. | H04W 52/0261 |
| | | | | 455/550.1 |
| 2011/0171923 | A1 * | 7/2011 | Daly ....................... | H04L 12/12 |
| | | | | 455/404.1 |
| 2012/0065802 | A1 * | 3/2012 | Seeber ................. | G06F 1/3203 |
| | | | | 700/295 |
| 2012/0147768 | A1 * | 6/2012 | Johnsson ............ | H04L 41/0833 |
| | | | | 370/252 |

(Continued)

*Primary Examiner* — Mahendra Patel

(74) *Attorney, Agent, or Firm* — Steven Reiss

(57) ABSTRACT

An electronic device includes a screen, a processor coupled to the screen, and a non-transitory storage device coupled to the processor and configured to store one or more programs executed by the processor, the one or more programs causing the processor to acquire a cumulative time of each signal intensity of a wireless signal received or transmitted by the electronic device and/or a cumulative time of each mobile network service mode provided to the electronic device at a time interval, detect whether the electronic device, in a current mobile network service mode, is power-guzzling according to the cumulative time of each signal intensity and/or the cumulative time of each mobile network service mode, and generate a prompt message when the electronic device is power-guzzling.

12 Claims, 2 Drawing Sheets

(56) References Cited

U.S. PATENT DOCUMENTS

| | | | |
|---|---|---|---|
| 2012/0239949 A1* | 9/2012 | Kalyanasundaram | G06F 1/3212 713/320 |
| 2013/0339759 A1* | 12/2013 | Doddavula ........... | G06F 1/3206 713/300 |
| 2015/0071139 A1* | 3/2015 | Nix ................... | H04W 52/0235 370/311 |
| 2015/0141068 A1* | 5/2015 | Immonen ................ | H04L 5/001 455/522 |
| 2015/0141070 A1* | 5/2015 | Goto .................... | H04W 52/08 455/522 |
| 2015/0220127 A1* | 8/2015 | Kukoyi ............. | H04W 52/0258 713/340 |

* cited by examiner

POWER CONSUMPTION DETECTION SYSTEM AND METHOD FOR ELECTRONIC DEVICE

CROSS-REFERENCE TO RELATED APPLICATIONS

This application claims priority to Chinese Patent Application No. 201510276098.8 filed on May 27, 2015, the contents of which are incorporated by reference herein.

FIELD

The subject matter herein generally relates to a power consumption detection system and a method for an electronic device operated in different mobile network service modes.

BACKGROUND

Electronic devices (for example, smart phones) have become smaller and more powerful in order to meet consumer needs and to improve portability and convenience. When the 2G (generation), 3G, and 4G network services are automatically and selectively provided to the electronic devices or the electronic devices are in a poor network coverage area, the network services and the wireless signals are weak. At this time, the electronic device must repeatedly scan the wireless signals for communicating with the base station which may increase battery consumption.

BRIEF DESCRIPTION OF THE DRAWINGS

Implementations of the present technology will now be described, by way of example only, with reference to the attached figures.

DETAILED DESCRIPTION

Figure 1:
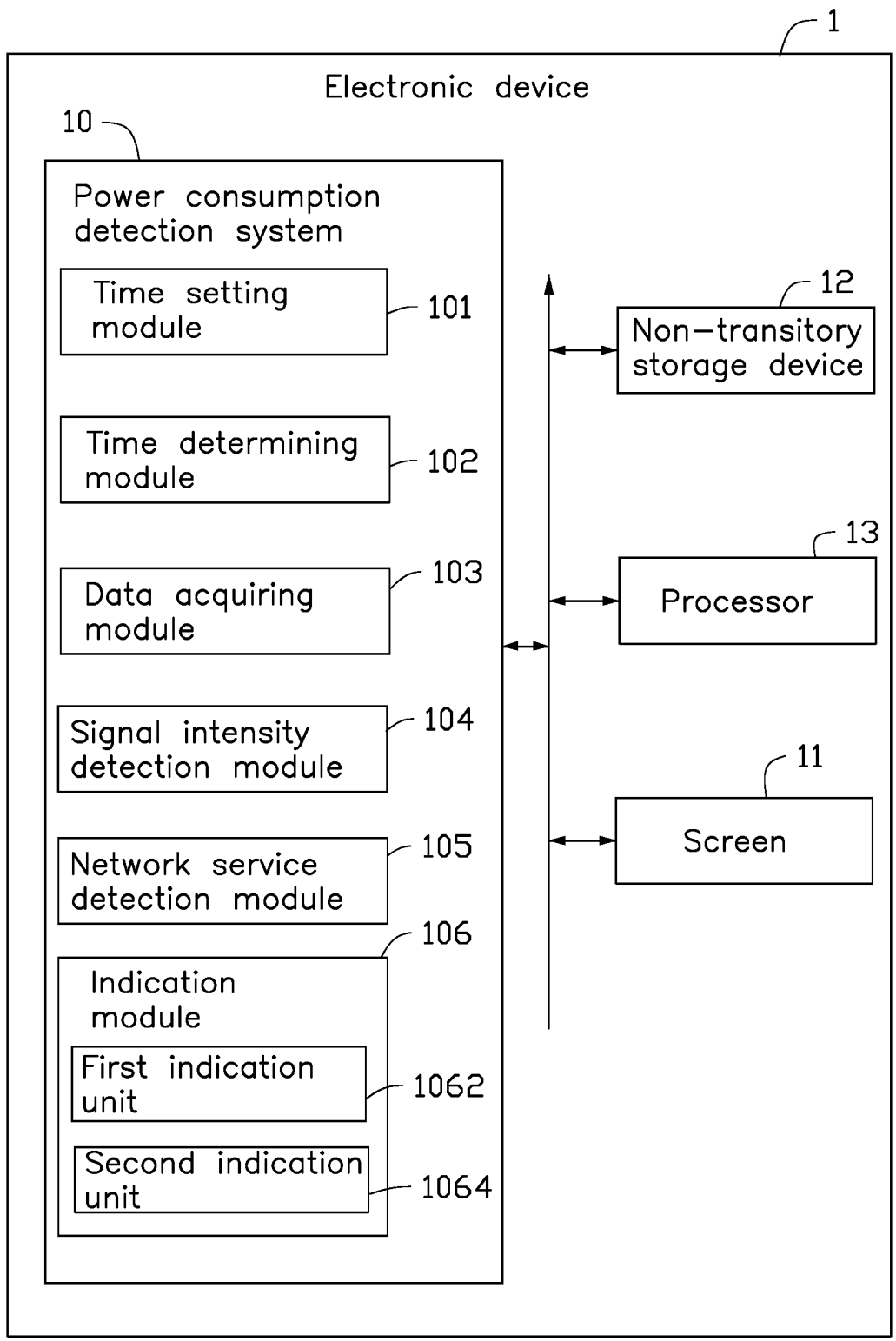
FIG. 1 illustrates a block diagram of an example embodiment of a power consumption detection system for an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "module" refers to logic embodied in computing or firmware, or to a collection of software instructions, written in a programming language, such as, Java, C, or assembly. One or more software instructions in the modules can be embedded in firmware, such as in an erasable programmable read only memory (EPROM). The modules described herein can be implemented as either software and/or computing modules and can be stored in any type of non-transitory computer-readable medium or other storage device. Some non-limiting examples of non-transitory computer-readable media include CDs, DVDs, BLU-RAY™, flash memory, and hard disk drives. The term "comprising", when utilized, means "including, but not necessarily limited to"; it specifically indicates open-ended inclusion or membership in the so-described combination, group, series and the like.

The present disclosure is described in relation to a power consumption detection system and a method for an electronic device operated in different mobile network service modes.

FIG. 1 illustrates a block diagram of an example embodiment of an electronic device 1. In at least one embodiment as shown in FIG. 1, the electronic device 1 can include, but is not limited to, a power consumption detection system 10, a screen 11, a non-transitory storage device 12, and a processor 13. FIG. 1 illustrates only one example of the electronic device 1, other examples can comprise more or fewer components than those shown in the embodiment, or have a different configuration of the various components.

The screen 11 can be a resistance touch screen, a capacitance touch screen, an optical touch screen, or an infrared touch screen. The non-transitory storage device 12 can be a non-transitory computer-readable medium and can be an internal storage device, such as a random access memory (RAM) for temporary storage of information, and/or a read only memory (ROM) for permanent storage of information. The non-transitory storage device 12 can also be an external storage device, such as an external hard disk, a storage card, or a data storage medium. The processor 13 executes one or more computerized codes and other applications of the electronic device 1 to provide functions of the electronic device 1.

In at least one embodiment, the power consumption detection system 10 can include, but is not limited to, a time setting module 101, a time determining module 102, a data acquiring module 103, a signal intensity detection module 104, a network service detection module 105, and an indication module 106. The above mentioned modules 101-106 can include computerized instructions in the form of one or more computer-readable programs that can be stored in a non-transitory computer-readable medium, such as the non-transitory storage device 12, and be executed by the processor 13 of the electronic device 1. In at least one embodiment, the electronic device 1 may be a cell phone, a smart watch, a personal digital assistant, a tablet computer, or any other computing devices having the touch screen.

The time setting module 101 is configured to pre-set a time period for detecting a power consumption state of the electronic device 1. In at least one embodiment, the time setting module 101 may set a time period of 8 a.m. to 22 p.m. In addition, the time setting module 101 is also configured to continuously time during the time period.

The time determining module 102 is configured to determine whether a current time reaches one of a plurality of predetermined time. In at least one embodiment, the plurality of predetermined time are stored in the non-transitory storage device 12, and a time interval of two neighboring predetermined time is about 15 minutes. For example, the plurality of predetermined time can be 8:15, 8:30, . . . , 21:30, 21:45, and 22:00. If the current time reaches one of the plurality of predetermined time (8:15, for example), the time determining module 102 triggers a first command to the data acquiring module 103. If the current time does not reach one of the plurality of predetermined time (8:15, for example), the time determining module 102 triggers a second command to the time setting module 101 to allow the time setting module 101 to continue to time. In other embodiments, the time interval can be 30 minutes.

The data acquiring module 103 is configured to acquire a cumulative time of a signal intensity of the wireless signal received/transmitted by the electronic device 1 and a cumulative time of a mobile network service mode provided to the electronic device 1 at each time interval, according to the first command from the time determining module 102.

The signal intensity may be indicated by a signal intensity indictor displayed on the screen 11, and the signal intensity indictor may includes 0-4 levels. For example, when the electronic device 1 is in a good network coverage area, the signal intensity indictor may have 3-4 levels. When the electronic device 1 is in a poor network coverage area, the signal intensity indictor may have 0-1 levels. At each time interval, the data acquiring module 103 counts a cumulative time of each of the different levels indicated by the signal intensity indictor, thereby acquiring the cumulative time of each signal intensity.

On the other hand, the mobile network service mode may include a 2G (generation) wireless network, a 3G wireless network, and/or a 4G wireless network. The 2G wireless network at least includes GPRS, EDGE. The 3G wireless network at least includes UMTS, CDMA, EVDO_0, EVDO_A, 1×RTT, HSDPA, HSUPA, HSPA, IDEN, EVDO_B, EHRPD, HSPAP. The 4G wireless network at least includes LTE. The data acquiring module 103 counts a cumulative time of each of GPRS, EDGE, UMTS, CDMA, EVDO_0, EVDO_A, 1×RTT, HSDPA, HSUPA, HSPA, IDEN, EVDO_B, EHRPD, HSPAP, LTE at each time interval, thereby acquiring the cumulative time of each mobile network service mode. In addition, the mobile network service mode further includes other wireless networks except the 2G wireless network, the 3G wireless network, and the 4G wireless network.

The signal intensity detection module 104 is configured to detect whether the electronic device 1 operated in a current mobile network service mode is power-guzzling according to the cumulative time of each signal intensity. If the cumulative time of the signal intensity indictor having 0-1 levels exceeds zero, the signal intensity detection module 104 determines the electronic device 1 is power-guzzling due to weak wireless signals, and then outputs a first indication signal to the indication module 106.

The network service detection module 105 is configured to detect whether the electronic device 1 operated in a current mobile network service mode is power-guzzling according to the cumulative time of each mobile network service mode. If there is no wireless network provided to the electronic device 1 or the electronic device 1 is not operated in a main mobile network such as a 2G wireless network, a 3G wireless network, or a 4G wireless network, the network service detection module 105 determines the electronic device 1 is power-guzzling due to non-ideal wireless networks, and then outputs a second indication signal to the indication module 106. Otherwise, the network service detection module 105 determines that the electronic device 1 is operated in the 2G wireless network, the 3G wireless network, or the 4G wireless network.

When the electronic device 1 is operated in the 2G wireless network, the 3G wireless network, or the 4G wireless network, the network service detection module 105 determines whether the cumulative time of the 2G wireless network exceeds zero. If the cumulative time of the 2G wireless network is zero, the network service detection module 105 determines the electronic device 1 is operated in the 3G wireless network or the 4G wireless network. At this time, the power consumption is less. Usually, the power consumption of the electronic device 1 operated in the 2G wireless network is greater than the power consumption of the electronic device 1 operated in the 3G wireless network or the 4G wireless network. If the cumulative time of the 2G wireless network exceeds zero, the network service detection module 105 further determines whether an optimum wireless network of the electronic device 1 is the 2G wireless network. If the optimum wireless network of the electronic device 1 is the 2G wireless network, the electronic device 1 may be operated in an optimum mode. At this time, the power consumption is less. If the optimum wireless network of the electronic device 1 is not the 2G wireless network, for example, the electronic device 1 operates in the 3G wireless network. At this time, the 2G wireless network and the 3G wireless network may be automatically and selectively used which may increase battery consumption, thus the network service detection module 105 determines the electronic device 1 is power-guzzling due to non-ideal wireless networks, and then outputs a third indication signal to the indication module 106.

The indication module 106 is configured to generate a prompt message according to the first indication signal from the signal intensity detection module 104 or the second indication signal or the third indication signal from the network service detection module 105, and the prompt message can be displayed on the screen 11. The indication module 106 includes a first indication unit 1062 and a second indication unit 1064. The first indication unit 1062 generates a first prompt message according to the first indication signal from the signal intensity detection module 104, and the first prompt message can be "power-guzzling due to weak wireless signals". The second indication unit 1064 generates a second prompt message according to the second indication signal or the third indication signal from the network service detection module 105, and the second prompt message can be "power-guzzling due to non-ideal wireless networks".

In other embodiments, the data acquiring module 103 only acquires the cumulative time of each signal intensity of the wireless signal received/transmitted by the electronic device 1 or the cumulative time of each mobile network service mode provided to the electronic device 1. Thus, one of the signal intensity detection module 104 and the network service detection module 105 can be omitted.

Figure 2:
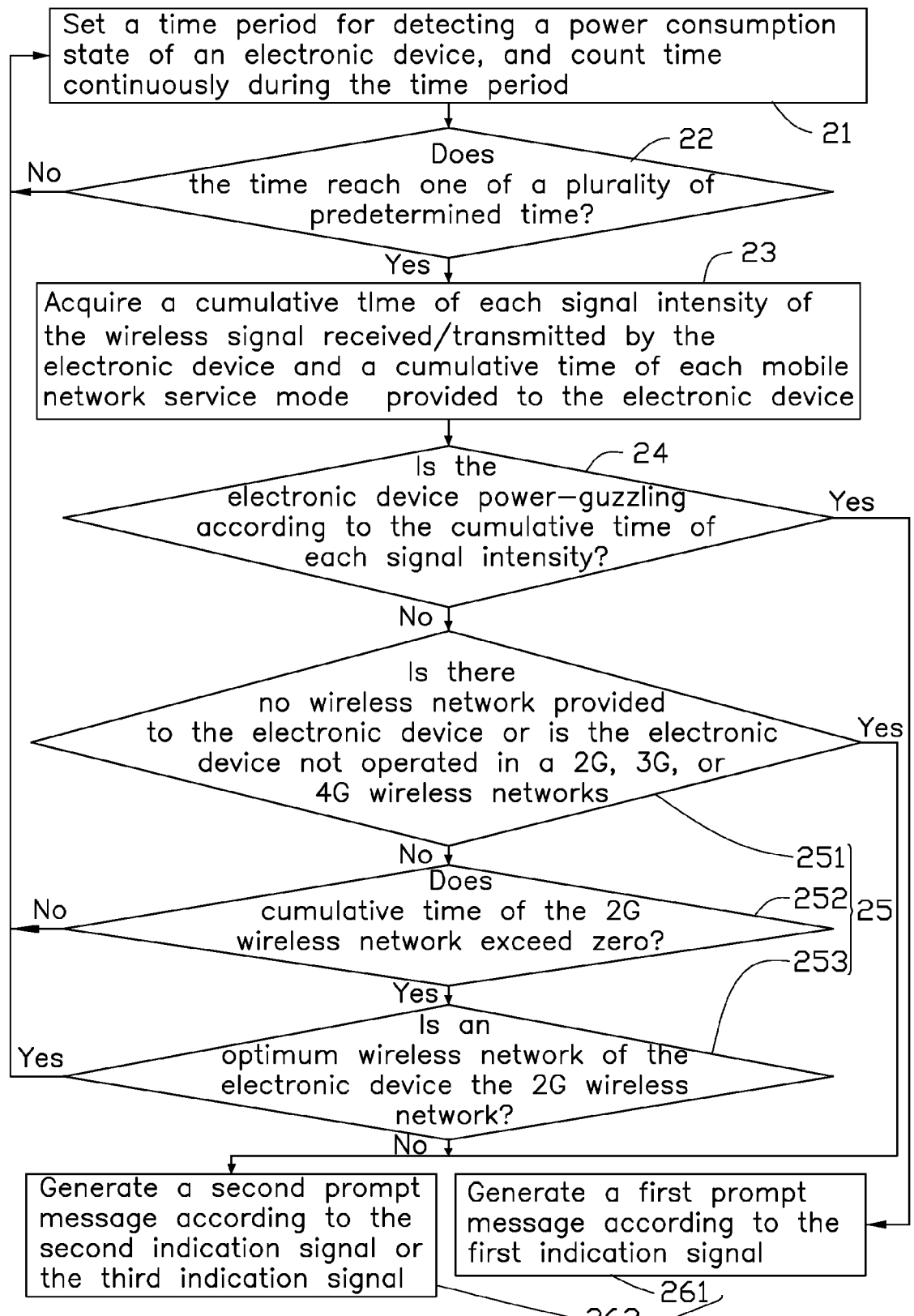
FIG. 2 illustrates a flowchart of a power consumption detection method for the electronic device of FIG. 1.

FIG. 2 illustrates a flowchart of a method for detecting power consumption of the electronic device 1 of FIG. 2. The method is provided by way of example, as there are a variety of ways to carry out the method. Each block shown in FIG. 2 represents one or more processes, methods, or subroutines which are carried out in the example method. Furthermore, the order of blocks is illustrative only and the order of the blocks can change. Additional blocks can be added or fewer blocks may be utilized without departing from the scope of this disclosure. The example method can begin at block 201.

At block 21, a time setting module sets a time period for detecting a power consumption state of an electronic device, and the time setting module counts time continuously during the time period.

At block 22, a time determining module determines whether a current time reaches one of a plurality of predetermined time. If the current time reaches one of the plurality of predetermined time, block 23 is implemented. If the current time does not reach one of the plurality of predetermined time, block 21 is implemented.

At block 23, a data acquiring module acquires a cumulative time of each signal intensity of the wireless signal received/transmitted by the electronic device and a cumulative time of each mobile network service mode provided to the electronic device. In detail, the data acquiring module counts the cumulative time of each of the different levels (0-4 levels, for example) indicated by the signal intensity indictor, between two neighboring predetermined time, thereby acquiring the cumulative time of each signal intensity. Additionally, the data acquiring module counts a cumulative time of each of GPRS, EDGE, UMTS, CDMA, EVDO_0, EVDO_A, 1×RTT, HSDPA, HSUPA, HSPA, IDEN, EVDO_B, EHRPD, HSPAP, LTE provided to the electronic device, thereby acquiring the cumulative time of each mobile network service mode at least including a 2G wireless network, a 3G wireless network, and a 4G wireless network At block 24, a signal intensity detection module detects whether the electronic device operated in a current mobile network service mode is power-guzzling according to the cumulative time of each signal intensity. For example, if the cumulative time of the signal intensity indictor having 0-1 levels exceeds zero, the signal intensity detection module determines that the electronic device is power-guzzling due to weak wireless signals and outputs a first indication signal to a indication module, and then block 261 is implemented. If the cumulative time of the signal intensity indictor having 0-1 levels is zero, the signal intensity detection module determines that the electronic device has a good reception, and block 251 is implemented.

At block 25, a network service detection module detects whether the electronic device operated in a current mobile network service mode is power-guzzling according to the cumulative time of each mobile network service mode. The block 25 further includes following sub-blocks.

At sub-block 251, the network service detection module detects whether there is no wireless network provided to the electronic device or the electronic device is not operated in a main mobile network such as a 2G wireless network, a 3G wireless network, or a 4G wireless network. If there is no wireless network provided to the electronic device or the electronic device is not operated in a main wireless network such as the 2G wireless network, the 3G wireless network, or the 4G wireless network, the network service detection module determines that the electronic device is power-guzzling due to non-ideal wireless networks and outputs a second indication signal to the indication module, and then block 262 is implemented. Otherwise, the network service detection module determines that the electronic device is operated in the 2G wireless network, the 3G wireless network, or the 4G wireless network, and block 252 is implemented.

At sub-block 252, the network service detection module determines whether the cumulative time of the 2G wireless network exceeds zero. If the cumulative time of the 2G wireless network is zero, block 21 is implemented. If the cumulative time of the 2G wireless network exceeds zero, sub-block 253 is implemented.

At sub-block 253, the network service detection module determines whether an optimum mobile network service mode of the electronic device is the 2G wireless network. If the optimum mobile network service mode of the electronic device is the 2G wireless network, block 21 is implemented. If the optimum mobile network service mode of the electronic device is not the 2G wireless network, the network service detection module determines the electronic device is power-guzzling due to non-ideal wireless networks and outputs a third indication signal to the indication module, and then sub-block 262 is implemented.

At block 26, the indication module generates a prompt message according to the first indication signal from the signal intensity detection module or the second indication signal or the third indication signal from the network service detection module, and the prompt message can be displayed on a screen. The block 26 further includes following sub-blocks.

At sub-block 261, a first indication unit generates a first prompt message according to the first indication signal from the signal intensity detection module, and the first prompt message can be "power-guzzling due to weak wireless signals".

At sub-block 262, a second indication unit generates a second prompt message according to the second indication signal or the third indication signal from the network service detection module, and the second prompt message can be "power-guzzling due to non-ideal wireless networks".

In another embodiment, the block S24 can be implemented after the block S25. In other embodiments, the block S23 can be that a data acquiring module acquires a cumulative time of each signal intensity of the wireless signal received/transmitted by the electronic device or a cumulative time of each mobile network service mode provided to the electronic device, and then one of the block S24 and the block S25 can be omitted.

In summary, the power consumption detection system 10 can acquire the cumulative time of a signal intensity of the wireless signal received/transmitted by the electronic device 1 or the cumulative time of a mobile network service mode provided to the electronic device 1, thereby determining whether the electronic device 1 is power-guzzling. Thus, the power consumption detection system 10 can monitor power consumption of the electronic device 1, so as to notify the user to implement a power saving policy such as turning off the mobile network service temporarily.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device comprising:
    a screen;
    a processor coupled to the screen;
    a non-transitory storage device coupled to the processor; and
    one or more programs stored in the non-transitory storage device and executed by the processor, the one or more programs causing the processor to:
        acquire a cumulative time of each signal intensity of a wireless signal received or transmitted by the electronic device and/or a cumulative time of each mobile network service mode provided to the electronic device at a time interval;
        detect whether the electronic device, in a current mobile network service mode, is power-guzzling according to the cumulative time of each signal intensity and/or the cumulative time of each mobile network service mode;
        generate a prompt message when the electronic device is power-guzzling;
        detect whether the electronic device is operated in one of a 2G wireless network, a 3G wireless network, and a 4G wireless network;

detect whether the cumulative time of the 2G wireless network exceeds zero; and
determine whether an optimum wireless network of the electronic device is the 2G wireless network.

2. The electronic device according to claim 1, wherein the one or more programs further cause the processor to set a time period for detecting a power consumption state of the electronic device and count time continuously during the time period.

3. The electronic device according to claim 2, wherein the one or more programs further cause the processor to determine whether a current time reaches one of a plurality of predetermined time, and the time interval indicates a time period between two neighboring predetermined time.

4. The electronic device according to claim 1, wherein if there is no wireless network provided to the electronic device or the electronic device is not operated in one of the 2G wireless network, the 3G wireless network, and the 4G wireless network, the one or more programs further cause the processor to determine the electronic device is power-guzzling and generate the prompt message.

5. The electronic device according to claim 1, wherein if the optimum wireless network of the electronic device is not the 2G wireless network, the one or more programs further cause the processor to determine the electronic device is power-guzzling due to non-ideal wireless networks and generate the prompt message.

6. The electronic device according to claim 1, wherein when the electronic device is power-guzzling according to the cumulative time of each signal intensity, the one or more programs further cause the processor to generate a first prompt message; and when the electronic device is power-guzzling according to the cumulative time of each mobile network service mode, the one or more programs further cause the processor to generate a second prompt message.

7. A method for detecting power consumption of an electronic device, the method comprising:
acquiring a cumulative time of each signal intensity of a wireless signal received or transmitted by the electronic device and/or a cumulative time of each mobile network service mode provided to the electronic device at a time interval;
detect whether the electronic device, in a current mobile network service mode, is power-guzzling according to the cumulative time of each signal intensity and/or the cumulative time of each mobile network service mode;
generate a prompt message when the electronic device is power-guzzling;
detect whether the electronic device is operated in one of a 2G wireless network, a 3G wireless network, and a 4G wireless network;
detect whether the cumulative time of the 2G wireless network exceeds zero; and
determine whether an optimum wireless network of the electronic device is the 2G wireless network.

8. The method according to claim 7, further comprising setting a time period for detecting a power consumption state of the electronic device and counting time continuously during the time period.

9. The method according to claim 8, further comprising determining whether a current time reaches one of a plurality of predetermined time, and the time interval indicates a time period between two neighboring predetermined time.

10. The method according to claim 7, wherein further comprising determining that the electronic device is power-guzzling and generating the prompt message when there is no wireless network provided to the electronic device or the electronic device is not operated in one of the 2G wireless network, the 3G wireless network, and the 4G wireless network.

11. The method according to claim 7, wherein further comprising determining that the electronic device is power-guzzling due to non-ideal wireless networks and generating the prompt message when the optimum wireless network of the electronic device is not the 2G wireless network.

12. The method according to claim 7, further comprising:
generating a first prompt message when the electronic device is power-guzzling according to the cumulative time of each signal intensity; and
generating a second prompt message when the electronic device is power-guzzling according to the cumulative time of each mobile network service mode.

* * * * *